(12) United States Patent
Wu et al.

(10) Patent No.: US 9,816,690 B2
(45) Date of Patent: Nov. 14, 2017

(54) FASTENER AND FASTENER ASSEMBLY

(71) Applicants: BOE TECHNOLOGY GROUP CO., LTD., Beijing (CN); BOE OPTICAL SCIENCE AND TECHNOLOGY CO., LTD., Jiangsu (CN)

(72) Inventors: Bing Wu, Beijing (CN); Jiefei Wu, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 143 days.

(21) Appl. No.: 14/771,766

(22) PCT Filed: Mar. 20, 2015

(86) PCT No.: PCT/CN2015/074691
§ 371 (c)(1),
(2) Date: Aug. 31, 2015

(87) PCT Pub. No.: WO2016/054895
PCT Pub. Date: Apr. 14, 2016

(65) Prior Publication Data
US 2016/0298830 A1    Oct. 13, 2016

(30) Foreign Application Priority Data

Oct. 10, 2014 (CN) .................... 2014 2 0584286 U (51) Int. Cl.
*F21V 17/16*    (2006.01)
*F16B 2/22*    (2006.01)

(52) U.S. Cl.
CPC ............. *F21V 17/16* (2013.01); *F16B 2/22* (2013.01)

(58) Field of Classification Search
CPC ...... F21V 17/16; F16B 2/22; Y10T 403/7005; Y10T 403/7007; Y10T 403/59;
(Continued)

(56) References Cited

U.S. PATENT DOCUMENTS

| 3,130,949 A | * | 4/1964 | Wolff | .......... E04B 9/006 248/343 |
| 5,087,106 A | * | 2/1992 | Betts | .......... F16B 12/34 312/263 |

(Continued)

FOREIGN PATENT DOCUMENTS

| CN | 2612210 Y | 4/2004 |
| CN | 102691983 A | 9/2012 |

(Continued)

OTHER PUBLICATIONS

First Office Action regarding Korean application No. 10-2015-7023707, dated Aug. 31, 2015. Translation provided by Dragon Intellectual Property Law Firm.
(Continued)

*Primary Examiner* — Laura Tso
(74) *Attorney, Agent, or Firm* — Harness, Dickey & Pierce, P.L.C.

(57) ABSTRACT

The present disclosure provides a fastener and a fastener assembly. The fastener includes a position limit column, an elastic member, and at least one fastening hook. The elastic member is disposed at a bottom portion of the position limit column, the first fixing member includes a fastening hole disposed at a portion corresponding to the fastening hook, and the first fixing member includes a position limit hole disposed at a portion corresponding to the position limit column. When the fastener moves to a predetermined position, the position limit column falls into the position limit hole and the fastening hook engages with the fastening hole, thus, the fastener is fixedly connected with the first fixing
(Continued)

member. This kind of fastener has a simple structure and does not need screws for mounting.

16 Claims, 6 Drawing Sheets

(58) Field of Classification Search
CPC ............ Y10T 403/591; Y10T 403/595; Y10T 403/599; Y10T 403/60; Y10T 403/606
USPC ........ 362/396, 364, 365, 148, 150; 403/348, 403/349, 321, 322.1, 322.4, 325, 326, 329
See application file for complete search history.

(56) References Cited

U.S. PATENT DOCUMENTS

| | | | | |
|---|---|---|---|---|
| 7,404,688 | B2* | 7/2008 | Schwab | ............... B60Q 1/0491 362/505 |
| 7,448,822 | B2* | 11/2008 | Nebeker | ............. B60R 13/0206 24/580.1 |
| 2013/0208446 | A1* | 8/2013 | Heinrich | ................ F25D 27/00 362/92 |

FOREIGN PATENT DOCUMENTS

| | | |
|---|---|---|
| CN | 102853388 A | 1/2013 |
| CN | 202708652 U | 1/2013 |
| CN | 103453470 A | 12/2013 |
| CN | 204084226 U | 1/2015 |
| EP | 0994292 A2 | 4/2000 |
| JP | 2003346539 A | 12/2003 |
| JP | 2005317335 A | 11/2005 |

OTHER PUBLICATIONS

International Search Report and Written Opinion of the International Searching Authority for international application No. PCT/CN2015/074691, dated Mar. 20, 2015.

\* cited by examiner

FASTENER AND FASTENER ASSEMBLY

CROSS REFERENCE TO RELATED APPLICATIONS

This application is the U.S. national phase of PCT Application No. PCT/CN2015/074691 filed on Mar. 20, 2015, which claims a priority to Chinese Patent Application No. 201420584286.8 filed on Oct. 10, 2014, the disclosures of which are incorporated in their entirety by reference herein.

TECHNICAL FIELD

The present disclosure relates to a field of illumination, particularly relates to a fastener and a fastener assembly used in the field of illumination.

BACKGROUND

According to a prior art, a bottom panel of a ceiling lamp is usually equipped to a ceiling, and then, a fastener is fixed to the bottom panel using screws. This kind of fixing has a complicated structure. Specifically, when equipping the ceiling lamp, an operator should use professional tools to screw multiple screws between bottom panel and the fastener, so that the fastener is fixed to the bottom panel. The mounting requires complicated work and costs time. Further, when repairing the ceiling lamp, the operator should use professional tools to remove the screws screwed between the bottom panel and the fastener in order to depart the fastener from the bottom panel. The dismounting of the fastener requires complicated work and costs time. As described above, conventional mounting of the fastener to the bottom panel and conventional dismounting of the fastener from the bottom panel requires complicated work, and needs higher manpower cost and time cost. Thus, this kind of fastener cannot satisfy increasing needs of the user for the lamps.

SUMMARY

In order to solve above-described problem, the present disclosure provides a fastener and a fastener assembly. The fastener and the fastener assembly solves the problem that conventional mounting of the fastener to the bottom panel and conventional dismounting of the fastener from the bottom panel requires complicated work, and needs higher manpower cost and time cost.

Regarding above-described difficulty, the present disclosure provides a fastener. The fastener includes a position limit column; an elastic member; and at least one fastening hook, the elastic member is disposed at a bottom portion of the position limit column, a first fixing member includes a fastening hole disposed at a portion corresponding to the fastening hook, the first fixing member further includes a position limit hole disposed at a portion corresponding to the position limit column, when the fastening hook is placed in the vicinity of the fastening hole, the position limit column is pressed against the first fixing member to cause deformation of the elastic member, and the elastic member generates an elastic force in a rebound direction, when the fastener moves to a predetermined position, the position limit column falls into the position limit hole under the action of the elastic force and the fastener is fixed at a proper position, and when the position limit column falls into the position limit hole, the fastening hook engages with the fastening hole and the fastener is fixedly connected with the first fixing member.

Alternatively, the at least one fastening hook includes two fastening hooks, one of the two fastening hooks is disposed at one end of the fastener, and the other one of the two fastening hooks is disposed at the other end of the fastener.

Alternatively, the position limit column is disposed between the two fastening hooks.

Alternatively, a free end of the fastening hook is disposed in a first direction and the first direction is identical to a mounting direction of the fastener.

Alternatively, the elastic member is an elastic plate, one end of the elastic plate is fixed to the fastener, and the position limit column is disposed at the other end of the elastic plate.

Alternatively, the position limit column is formed integrally with the elastic plate.

Alternatively, the fastener is formed as a single piece.

The present disclosure further provides a fastener assembly. The fastener assembly includes a first fixing member; a second fixing member; and a plurality of abovementioned fasteners, a protruded portion is disposed at a periphery of the second fixing member and the protruded portion is bent toward an inner direction and corresponds to the fastener, and the protruded portion cooperates with the fastener for fixedly connecting the first fixing member with the second fixing member.

Alternatively, the fastener includes a lip at a side away from the first fixing member, and the lip engages with the protruded portion for fixedly connecting the first fixing member with the second fixing member.

Alternatively, the fastener is formed integrally with the lip, and the second fixing member is formed integrally with the protruded portion.

The present disclosure provides the following advantages.

In the fastener and the fastener assembly provided in the present disclosure, the fastener includes a position limit column, an elastic member, and at least one fastening hook. The elastic member is disposed at the bottom portion of the position limit column. A first fixing member includes the fastening hole disposed at the portion corresponding to the fastening hook. The first fixing member further includes a position limit hole disposed at a portion corresponding to the position limit column. When the fastener moves to the predetermined position, the position limit column falls into the position limit hole, and at the same time, the fastening hook engages with the fastening hole. Thus, the first fixing member is fixedly connected with the second fixing member. This kind of fastener has a simple structure and does not need screws for mounting. Thus, mounting and dismounting do not need professional tools, and are convenient and efficient. Thus, this kind of fastener can reduce manpower cost and time cost.

DETAILED DESCRIPTION

To make the the technical solutions of the present disclosure more apparent, the following will describe the fastener and the fastener assembly according to the present disclosure with reference to specific embodiments and accompanying drawings.

First Embodiment

Figure 1:
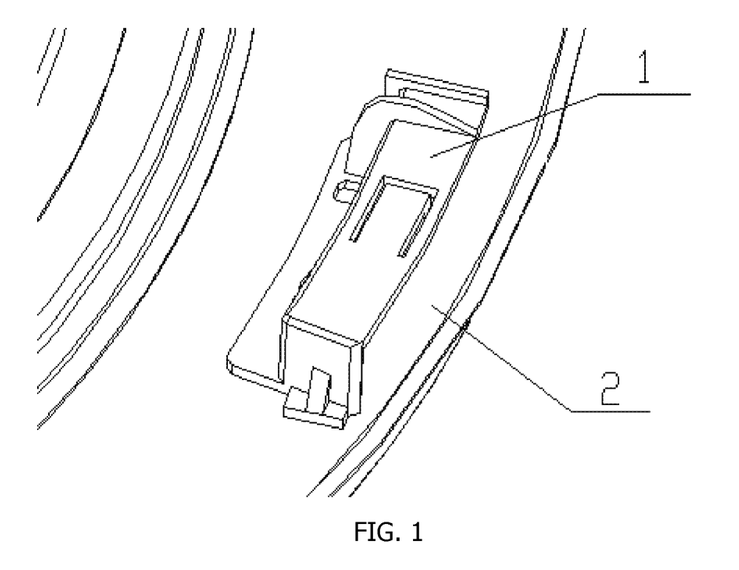
FIG. 1 is a schematic diagram showing a fastener according to a first embodiment of the present disclosure when the fastener is fixed to a first fixing member.
Figure 2:
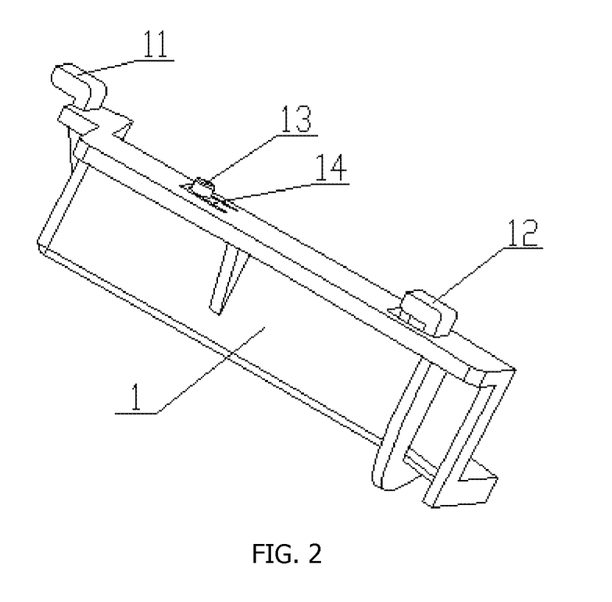
FIG. 2 is a diagram showing a perspective view of the fastener shown in FIG. 1.
Figure 3:
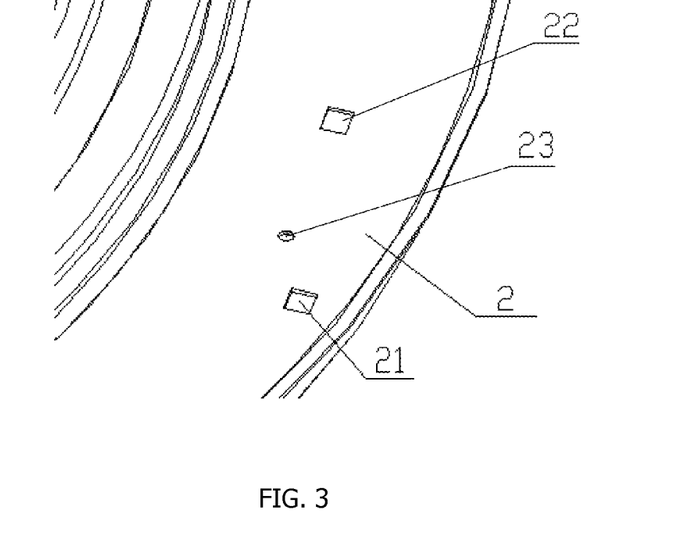
FIG. 3 is a schematic diagram showing configurations of a fastening hole and a position limit hole of the first fixing member.

FIG. 1 is a schematic diagram showing a fastener 1 according to a first embodiment of the present disclosure when the fastener is 1 fixed to a first fixing member. FIG. 2 is a diagram showing a perspective view of the fastener 1 shown in FIG. 1. FIG. 3 is a schematic diagram showing configurations of fastening holes 21, 22 and a position limit hole 23 of the first fixing member. As shown in FIG. 1 to FIG. 3, the fastener 1 includes a position limit column 13, an elastic member 14, and at least one fastening hook 11. The elastic member 14 is disposed at a bottom portion of the position limit column 13. The first fixing member includes a fastening hole 21 disposed at a portion corresponding to the fastening hook 11. The first fixing member includes a position limit hole 23 disposed at a portion corresponding to the position limit column 13.

As an example, the first fixing member may be provided by a bottom panel 2. When the fastening hook 11 is placed in the vicinity of the fastening hole 21, the position limit column 13 is pressed against the bottom panel 2 and the elastic member is in a deformed state. Thus, the elastic member generates an elastic force in a rebound direction. When the fastener 1 moves to a predetermined position, the position limit column 13 falls in to the position limit hole 23 under the elastic force. Thus, the fastener 1 is fixed at a proper position. When the position limit column 13 falls into the position limit hole 23, the fastening hook 11 engages with the fastening hole 21 and the fastener 1 is fixedly connected with the first fixing member 2. As described above, when fixedly connecting the fastener 1 with the first fixing member 2, no screws are used. Thus, the fastener has a simple structure. Further, when replacing the fastener, for example, equipping and dismounting the fastener, an operator does not need any professional tools. Thus, the whole work can be more convenient and efficient, and can reduce manpower cost and time cost.

In the present embodiment, there are two fastening hooks. One fastening hook 11 is disposed at one end of the fastener 1, and the other fastening hook 12 is disposed at the other end of the fastener 1. Correspondingly, the first fixing member (for example, bottom panel 2) includes two fastening holes. One fastening hole 21 is disposed at a portion of the bottom panel 2 corresponding to the fastening hook 11. The other fastening hole 22 is disposed at a portion of the bottom panel 2 corresponding to the fastening hook 12. In the actual application, the number of the fastening hooks may be greater than two. Multiple fastening hooks may be distributed at different portions of the fastener 1 and the fastening hooks are uniformly distributed for ensuring a uniform force receiving. With this configuration, the fastener 1 can be fixed to the bottom panel 2 more tightly.

Alternatively, the position limit column 13 may be disposed between the fastening hook 11 and the fastening hook 12. Preferably, the position limit column 13 is disposed at a center portion between fastening hook 11 and the fastening hook 12. The position limit column 13 cooperates with the position limit hole 23 for fixedly connecting a position of the fastener 1. When the position limit column 13 is disposed at a center portion of the two fastening hooks 11 and 12, the fastener 1 receives a force from the position limit column 13 more uniformly for fixedly connecting the fastener 1. Thus, the fastener 1 can be more tightly fixed at a proper position.

In the present embodiment, the elastic member is provided by an elastic plate 14. One end of the elastic plate 14 is fixed to the fastener 1. On the other end of the elastic plate 14, the position limit column 13 is disposed. Alternatively, a free end of the fastening hook 11 may be disposed in a first direction (that is, mounting direction). The first direction is identical to a moving direction of the fastener 1 when equipping the fastener 1. Thus, the fastening hook 11 can be smoothly engaged with the fastening hole 21, and the fastener can be more tightly fixed to the bottom panel.

Figure 4:
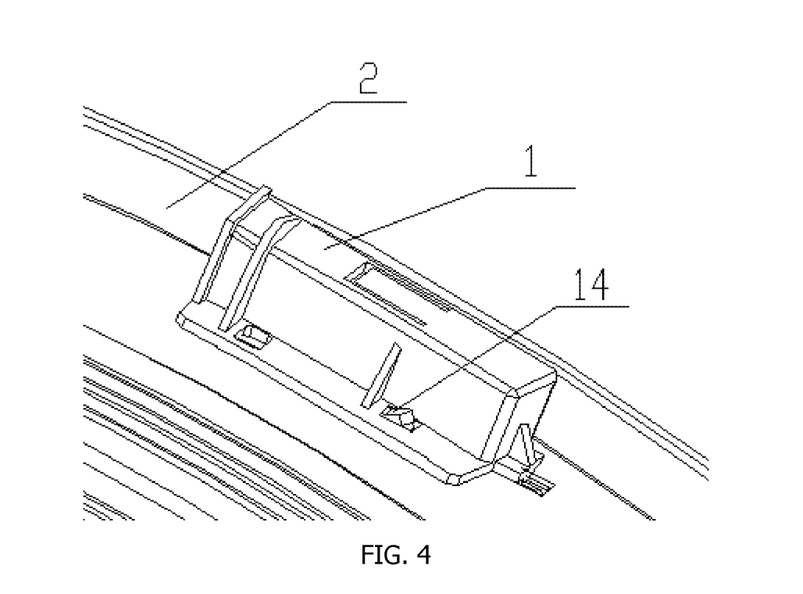
FIG. 4 is a schematic diagram showing the fastener shown in FIG. 1 when the fastener is in an equipped state.
Figure 5:
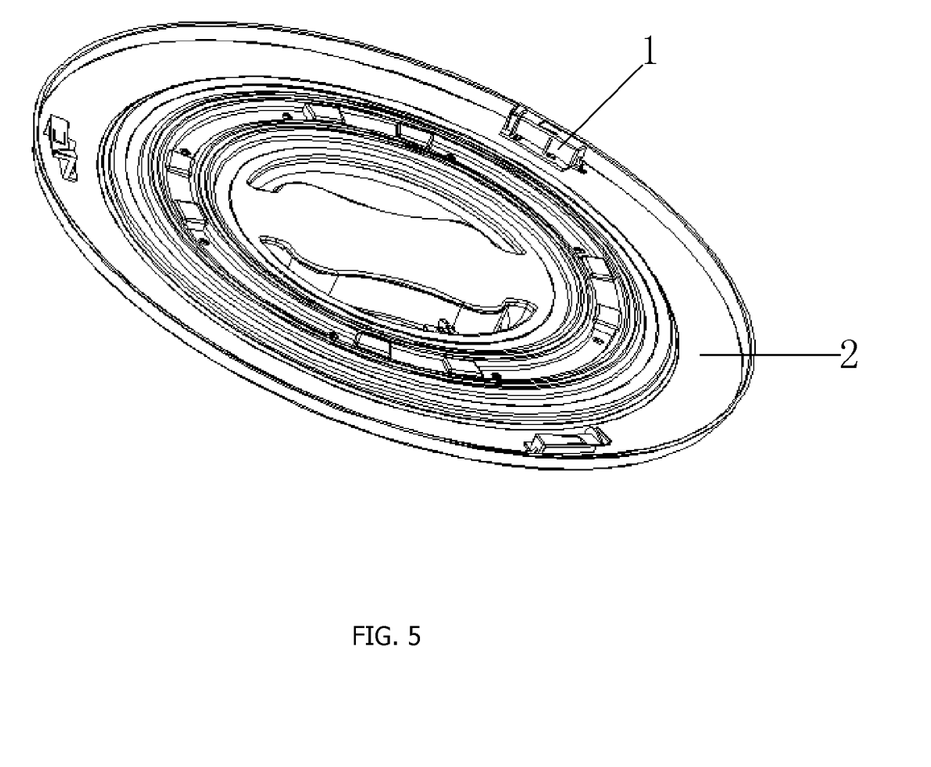
FIG. 5 is a perspective view showing a fixed connection between multiple fasteners and a first fixing member.

FIG. 4 is a schematic diagram showing the fastener 1 shown in FIG. 1 when the fastener 1 is in an equipped state. FIG. 5 is a diagram showing a perspective view of multiple fasteners and the first fixing member (for example, bottom panel 2) when they are fixed together. As shown in FIG. 4 and FIG. 5, the fastening hook 11 and the fastening hook 12 are respectively positioned in the vicinity of the fastening hole 21 and in the vicinity of the fastening hole 22. At this time, since the position limit column 13 is pressed against the bottom panel 2, the elastic plate 14 is in a deformed state. Thus, the elastic plate 14 generates an elastic force in a rebound direction. When moving the fastener 1 in the first direction (that is, mounting direction) and the position limit column 13 is moved to right above portion of the position limit hole 23, the position of the fastener 1 is referred to as the predetermined position. At this time, the position limit column 13 falls into the position limit hole 23 under the elastic force of the elastic plate 14. Thus, the position of the fastener 1 is fixed. At the same time, the fastening hook 11 is engaged with the fastening hole 21, and the fastening hook 12 is engaged with the fastening hole 22. Thus, the fastener 1 is fixedly connected with the bottom panel 2. Above described mounting of the fastener does not use any professional tools, and does not need screw multiple screws between the bottom panel and the fastener. Thus, the whole mounting work or dismounting work can be more convenient and efficient, and manpower cost and time cost can be reduced. Accordingly, working efficiency can be improved.

The following will describe a dismounting of the fastener 1. First, the position limit column 13 is departed from the position limit hole 23 using any method. For example, the elastic plate 14 is levered up at an opposite side of the position limit column 13 using finger or other proper tools. Alternatively, the position limit column 13 is pressed at one side using any proper tools so that the position limit column 13 departs from the position limit hole 23. Then, in the second direction (that is, dismounting direction) opposite to the first direction, the fastener 1 is moved. With this moving, the engagement between the fastening hook 11 and the fastening hole 21 is released, and the engagement between the fastening hook 12 and the fastening hole 22 is released. At the end, the fastener 1 can be removed from the bottom panel 2. Above-described dismounting of the fastener does not use any professional tools. Further, no screws need to be removed between the bottom panel and the fastener. Thus, the whole mounting work or dismounting work can be more convenient and efficient, and manpower cost and time cost can be reduced. Accordingly, working efficiency can be improved.

Preferably, the position limit column 13 and the elastic plate 14 are formed integrally with each other. More preferably, the whole fastener 1 is formed as a single piece. When forming as a single piece, the fastener has a more simple structure, and the mounting and dismounting becomes more convenient and efficient.

The fastener according to the present embodiment includes the position limit column, the elastic member, and at least one fastening hook. The elastic member is disposed at the bottom portion of the position limit column. The first fixing member includes the fastening hole disposed at the portion corresponding to the fastening hook, and the first fixing member includes the position limit hole disposed at the portion corresponding to the position limit column. When the fastener moves to the predetermined position, the position limit column falls into the position limit hole and the fastening hook engages with the fastening hole. Thus, fastener is fixedly connected with the first fixing member. This kind of fastener has a simple structure and does not need screws for equipment. Thus, equipment and dismounting do not need professional tools, and are convenient and efficient. Thus, this fastener can reduce manpower cost and time cost.

Second Embodiment

Figure 6:
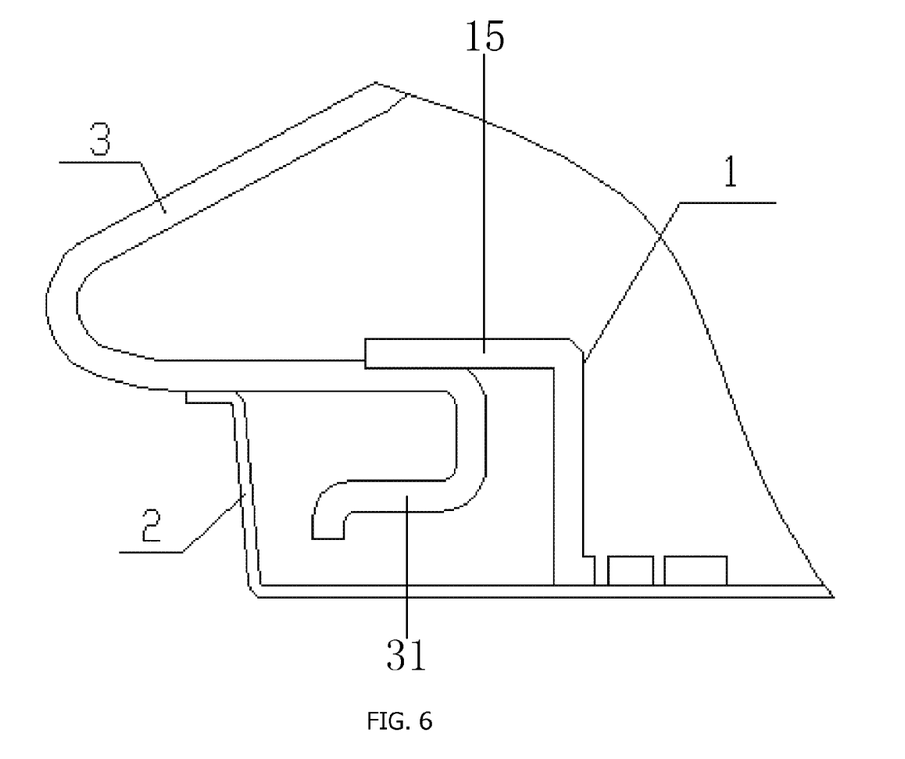
FIG. 6 is a diagram showing partial sectional view of a fastener assembly according to a second embodiment of the present disclosure.
Figure 7:
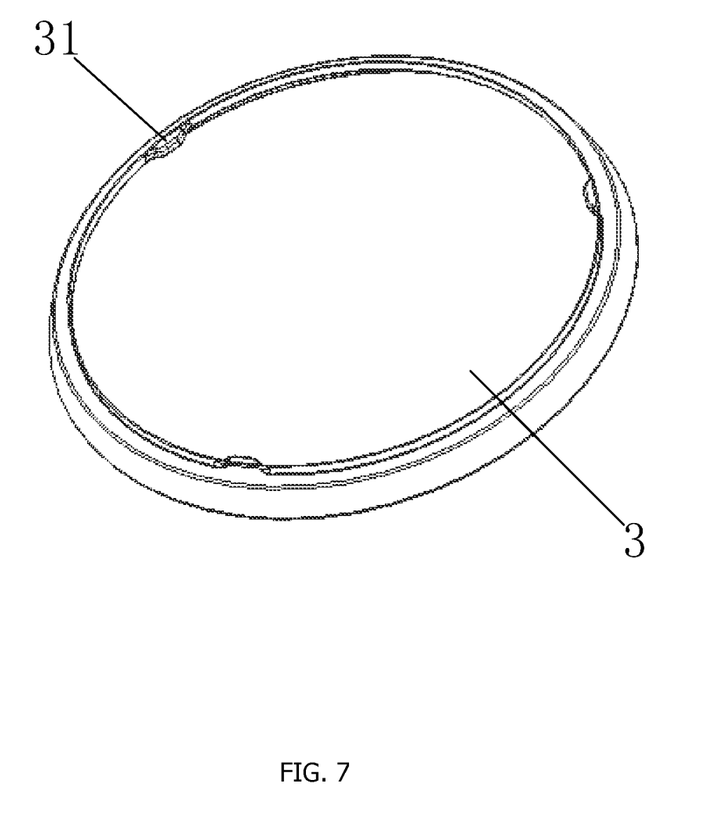
FIG. 7 is a diagram showing a perspective view of the second fixing member.
Figure 8:
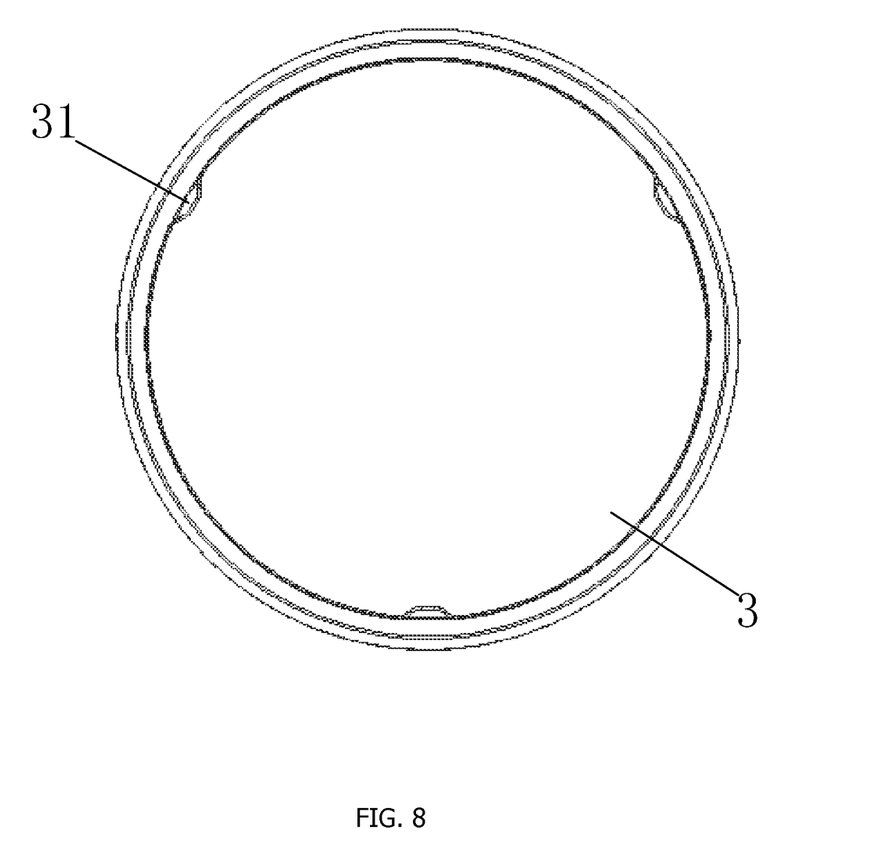
FIG. 8 is a diagram showing a front view of the second fixing member.

FIG. 6 is a diagram showing a partial sectional view of a fastener assembly according to a second embodiment of the present disclosure. FIG. 7 is a diagram showing a perspective view of the second fixing member. FIG. 8 is a diagram showing a front view of the second fixing member. As shown in FIGS. 6 to 8, the fastener assembly includes a first fixing member 2, a second fixing member 3, and multiple fasteners 1 according to the first embodiment. A configuration of the fastener 1 and mounting or dismounting of the fastener 1 to or from the first fixing member 2 are similar to the first embodiment, and details are described in the above-described first embodiment. As shown in FIG. 6 to FIG. 8, a protruded portion 31 is disposed at a periphery of the second fixing member 3 and the protruded portion 31 is bent toward an inner direction and corresponds to the fastener 1, and the protruded portion cooperates with the fastener 1 for fixedly connecting the first fixing member with the second fixing member.

In the present embodiment, the fastener assembly is a lamp, the second fixing member is a lamp cover, and the first fixing member is a bottom panel 2. In an actual application, the fastener assembly may be a display apparatus, the first fixing member may be a display monitor main body, and the second fixing member may be an outer cover. Any other apparatuses having the structures disclosed in the present disclosure are included in the scope of the present disclosure.

Preferably, the fastener 1 includes a lip at a side away from the first fixing member. The lip engages with the protruded portion for fixedly connecting the first fixing member with the second fixing member. As shown in FIG. 6, in the present embodiment, the fastener 1 includes the lip 15 at a side away from the bottom panel 2, and the lip 15 engages with the protruded portion 31 of the lamp cover 3 for fixedly connecting the bottom panel 2 with the lamp cover 3. When equipping, the lamp cover 3 is placed on the bottom panel 2 so that the fastener 1 is displaced from the protruded portion 31. Then, the lamp cover 3 is rotated so that the lip 15 engages with the protruded portion 31 for fixedly connecting the bottom panel 2 with the lamp cover 3.

In the present embodiment, the number of the fasteners 1 is three, and the number of the protruded portions 31 is three. In an actual application, the number of the fasteners 1 may be three to six, and the number of the protruded portions 31 may be three to six. The number of the fasteners 1 and the number of the protruded portions 31 may also be increased corresponding to actual needs. Preferably, the fastener 1 is formed integrally with the lip 15, and the lamp cover 3 is formed integrally with the protruded portion 31. By forming integrally, the lamp can have a more simple structure and mounting and dismounting becomes convenient and efficient.

In the fastener assembly according to the present embodiment, the fastener includes the position limit column, the elastic member, and at least one fastening hook. The elastic member is disposed at the bottom portion of the position limit column. The first fixing member includes the fastening hole disposed at the portion corresponding to the fastening hook, and the first fixing member includes the position limit hole disposed at the portion corresponding to the position limit column. When the fastener moves to the predetermined position, the position limit column falls into the position limit hole and the fastening hook engages with the fastening hole. Thus, fastener is fixed with the first fixing member. This kind of fastener has a simple structure and does not need screws for mounting. Thus, mounting and dismounting do not need professional tools. Thus, when replacing the fastener, the first fixing member, or the second fixing member, the replacing work becomes more convenient and usability is improved. Further, since the replacing work becomes convenient and efficient, manpower cost and time cost are reduced.

Preferred embodiments of the present disclosure are described. It should be noted for a person skilled in the art of the present disclosure, without departing from a principle and a premise of the present disclosure, various modifications and improvements can be made, and these improvements and modifications should also be considered to be included within a scope of the present disclosure.

What is claimed is:
1. A fastener comprising:
   a first plate, wherein a position limit column, an elastic member, and at least one fastening hook are formed on the first plate; and
   a side plate formed at one end of the fastener and intersecting the first plate,
   wherein the at least one fastening hook is formed at one side of the side plate away from the elastic member,
   the elastic member is disposed at a bottom portion of the position limit column, a first fixing member includes a fastening hole disposed at a portion corresponding to the fastening hook, the first fixing member further includes a position limit hole disposed at a portion corresponding to the position limit column,
   when the fastening hook is placed in the vicinity of the fastening hole, the position limit column is pressed against the first fixing member to cause deformation of the elastic member, and the elastic member generates an elastic force in a rebound direction,
   when the fastener moves to a predetermined position, the position limit column falls into the position limit hole under the action of the elastic force and the fastener is fixed at a proper position, and when the position limit column falls into the position limit hole, the fastening hook engages with the fastening hole and the fastener is fixedly connected with the first fixing member.

2. The fastener according to claim 1, wherein the at least one fastening hook includes two fastening hooks, one of the two fastening hooks is disposed at one end of the fastener and at the one side of the side plate away from the elastic member, and the other one of the two fastening hooks and the elastic member are disposed at the other end of the fastener and at the other side of the side plate.

3. The fastener according to claim 2, wherein the position limit column is disposed between the two fastening hooks.

4. The fastener according to claim 1, wherein a free end of the fastening hook is disposed in a first direction and the first direction is identical to a mounting direction of the fastener.

5. The fastener according to claim 1, wherein the elastic member is an elastic plate, one end of the elastic plate is fixed to the fastener, and the position limit column is disposed at the other end of the elastic plate.

6. The fastener according to claim 5, wherein the position limit column is formed integrally with the elastic plate.

7. The fastener according to claim 1, wherein the fastener is formed as a single piece.

8. A fastener assembly comprising:
a first fixing member;
a second fixing member; and
a plurality of fasteners according to claim 1, wherein
a protruded portion is disposed at a periphery of the second fixing member and the protruded portion is bent toward an inner direction and corresponds to the fastener, and the protruded portion cooperates with the fastener for fixedly connecting the first fixing member with the second fixing member.

9. The fastener assembly according to claim 8, wherein the fastener includes a lip at a side away from the first fixing member, and the lip engages with the protruded portion for fixedly connecting the first fixing member with the second fixing member.

10. The fastener assembly according to claim 9, wherein the fastener is formed integrally with the lip, and the second fixing member is formed integrally with the protruded portion.

11. A fastener assembly comprising:
a first fixing member;
a second fixing member; and
a plurality of fasteners according to claim 2, wherein
a protruded portion is disposed at a periphery of the second fixing member and the protruded portion is bent toward an inner direction and corresponds to the fastener, and the protruded portion cooperates with the fastener for fixedly connecting the first fixing member with the second fixing member.

12. A fastener assembly comprising:
a first fixing member;
a second fixing member; and
a plurality of fasteners according to claim 3, wherein
a protruded portion is disposed at a periphery of the second fixing member and the protruded portion is bent toward an inner direction and corresponds to the fastener, and the protruded portion cooperates with the fastener for fixedly connecting the first fixing member with the second fixing member.

13. A fastener assembly comprising:
a first fixing member;
a second fixing member; and
a plurality of fasteners according to claim 4, wherein
a protruded portion is disposed at a periphery of the second fixing member and the protruded portion is bent toward an inner direction and corresponds to the fastener, and the protruded portion cooperates with the fastener for fixedly connecting the first fixing member with the second fixing member.

14. A fastener assembly comprising:
a first fixing member;
a second fixing member; and
a plurality of fasteners according to claim 5, wherein
a protruded portion is disposed at a periphery of the second fixing member and the protruded portion is bent toward an inner direction and corresponds to the fastener, and the protruded portion cooperates with the fastener for fixedly connecting the first fixing member with the second fixing member.

15. A fastener assembly comprising:
a first fixing member;
a second fixing member; and
a plurality of fasteners according to claim 6, wherein
a protruded portion is disposed at a periphery of the second fixing member and the protruded portion is bent toward an inner direction and corresponds to the fastener, and the protruded portion cooperates with the fastener for fixedly connecting the first fixing member with the second fixing member.

16. A fastener assembly comprising:
a first fixing member;
a second fixing member; and
a plurality of fasteners according to claim 7, wherein
a protruded portion is disposed at a periphery of the second fixing member and the protruded portion is bent toward an inner direction and corresponds to the fastener, and the protruded portion cooperates with the fastener for fixedly connecting the first fixing member with the second fixing member.

* * * * *